United States Patent
Dehne et al.

(10) Patent No.: US 9,447,819 B2
(45) Date of Patent: Sep. 20, 2016

(54) THRUST WASHER HAVING LUBRICANT POCKETS

(71) Applicant: E. Winkemann GmbH, Plettenberg (DE)

(72) Inventors: Detlev Dehne, Herscheid (DE); Heinrich Zdrojewski, Plettenberg (DE); Bernd Sent, Lüdenscheid (DE)

(73) Assignee: E. Winkemann GmbH, Plettenberg (DE)

( * ) Notice: Subject to any disclaimer, the term of this patent is extended or adjusted under 35 U.S.C. 154(b) by 0 days.

(21) Appl. No.: 14/402,963

(22) PCT Filed: Apr. 10, 2014

(86) PCT No.: PCT/EP2014/057228
§ 371 (c)(1),
(2) Date: Nov. 21, 2014

(87) PCT Pub. No.: WO2014/173689
PCT Pub. Date: Oct. 30, 2014

(65) Prior Publication Data
US 2016/0032970 A1    Feb. 4, 2016

(30) Foreign Application Priority Data

Apr. 24, 2013   (DE) .................. 10 2013 104 129

(51) Int. Cl.
*F16C 33/10*   (2006.01)
*F16C 17/04*   (2006.01)
(Continued)

(52) U.S. Cl.
CPC ........... *F16C 33/1075* (2013.01); *F16C 17/04* (2013.01); *F16C 17/18* (2013.01);
(Continued)

(58) Field of Classification Search
CPC ............ F16C 33/1065; F16C 33/1085; F16C 33/6651; F16C 33/6681
USPC ............... 384/123, 291–293, 286, 368, 420
See application file for complete search history.

(56) References Cited

U.S. PATENT DOCUMENTS 2,872,256 A * 2/1959 Thomson ................ F16C 17/04
                                                      384/420
4,639,148 A    1/1987 Tamura et al.
(Continued)

FOREIGN PATENT DOCUMENTS

DE          6810086 U    4/1969
DE         19902565 A1   7/2000
(Continued)

OTHER PUBLICATIONS

International Preliminary Report on Patentability issued Oct. 27, 2015 in International Application No. PCT/EP2014/057228.
(Continued)

*Primary Examiner* — Phillip A Johnson
(74) *Attorney, Agent, or Firm* — Panitch Schwarze Belisario & Nadel LLP

(57) ABSTRACT

The invention relates to a thrust washer (I) having a central hole (2) for pushing onto a bolt or a shaft, wherein the thrust washer (I) has lubricant pockets (4, 4') on the two flat thrust surfaces (3, 3') thereof, characterized in that at least one lubricant pocket (4) is assigned a corresponding lubricant pocket (4') on the opposite thrust surface (3'), and at least one lubricant pocket (4, 4') is connected to the corresponding lubricant pocket (4, 4') thereof by way of at least one channel (6) which runs axially through the thrust washer (I) and is formed, in particular, in each case by a hole.

8 Claims, 4 Drawing Sheets

(51) Int. Cl.
*F16C 21/00* (2006.01)
*F16C 17/18* (2006.01)
*F16C 33/66* (2006.01)
*F16C 19/46* (2006.01)
*F16H 57/08* (2006.01)

(52) U.S. Cl.
CPC .......... *F16C 21/00* (2013.01); *F16C 33/6681* (2013.01); *F16C 19/46* (2013.01); *F16C 33/6677* (2013.01); *F16C 2361/61* (2013.01); *F16H 2057/085* (2013.01)

(56) References Cited

U.S. PATENT DOCUMENTS

| 4,726,695 | A | * | 2/1988 | Showalter | F16C 17/04 384/121 |
| 5,035,519 | A | * | 7/1991 | Aizawa | F16C 17/08 384/121 |
| 5,554,015 | A | * | 9/1996 | Dreiman | F04B 39/0094 384/368 |
| 7,401,980 | B2 | * | 7/2008 | Krauss | F01D 25/168 384/112 |
| 8,240,291 | B2 | * | 8/2012 | Ibrahim | 123/458 |
| 2002/0014743 | A1 | | 2/2002 | Zheng | |

FOREIGN PATENT DOCUMENTS

| DE | 102006053726 A1 | | 6/2008 |
| DE | 102010035851 A1 | | 3/2012 |
| EP | 2042753 A1 | | 4/2009 |
| JP | 61165016 A | * | 7/1986 |
| JP | 2001-082456 A | | 3/2001 |
| SU | 1670211 A1 | * | 8/1991 |

OTHER PUBLICATIONS

Int'l Search Report and Written Opinion issued Aug. 1, 2014 in Int'l Application No. PCT/EP2014/057228.

* cited by examiner

Fig. 4a
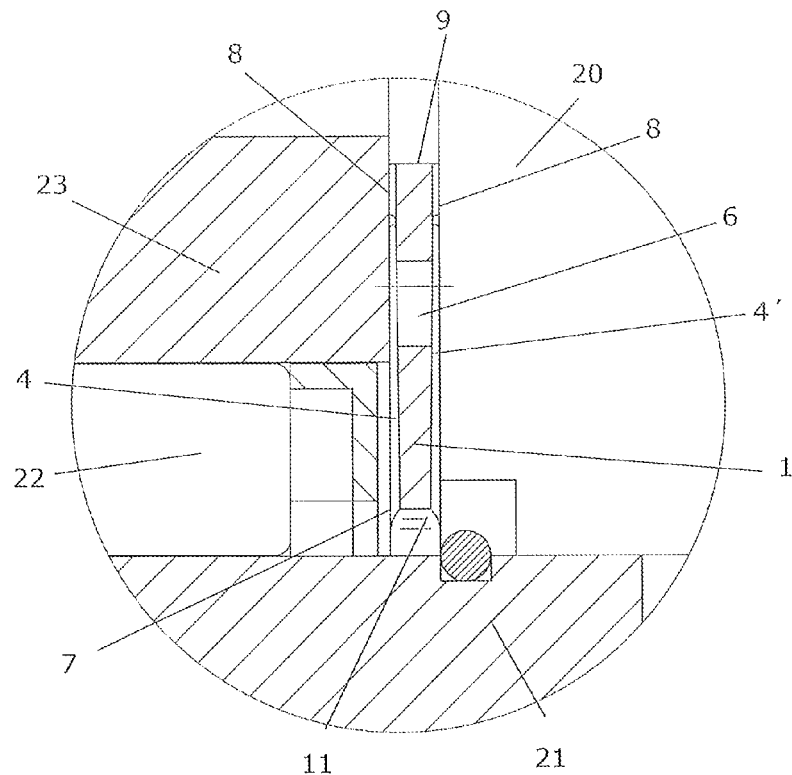
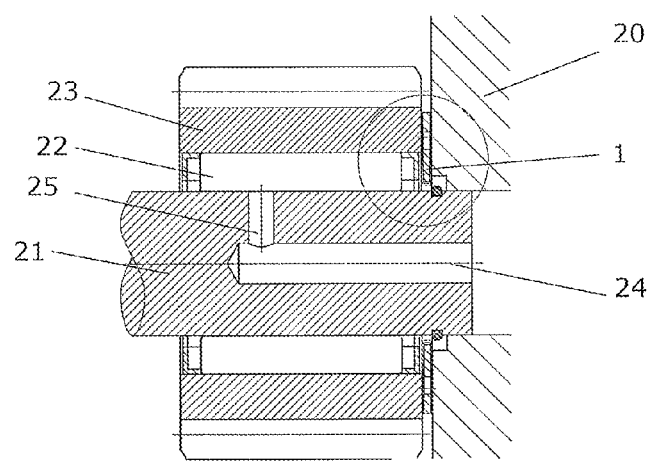
Fig. 4

THRUST WASHER HAVING LUBRICANT POCKETS

CROSS-REFERENCE TO RELATED APPLICATIONS

This application is a Section 371 U.S. National-Stage Application of PCT International Application No. PCT/EP2014/057228, filed Apr. 10, 2014, which was published in the German language on Oct. 30, 2014, under International Publication No. WO 2014/173689 A1, and which claims priority to German Patent Application No. 10 2013 104 129.9, the disclosures of which are incorporated herein by reference.

BACKGROUND

The invention relates to a thrust washer having a central hole for pushing onto a bolt or a shaft, wherein the thrust washer has lubricant pockets on both of its flat thrust surfaces.

Thrust washers of the type mentioned in the introduction are used, for example, in the engine and drive train of motor vehicles, for example in planet gears in planetary gear trains. In planetary gear trains, the thrust washers have the function of protecting the planet gears and the mostly unhardened planet carriers from wear and tear when the planet gear starts running. The thrust washers are seated with their respective mounting holes on the planet gear bolt. This is comparable with other places of application in the motor or in the drive train of motor vehicles.

The known thrust washers have lubricant film pockets which are supplied with lubricant via channels and grooves. In addition, thrust washers are known which have axial passage channels which are generally formed by holes.

Thus, a thrust washer is known from DE 10 2010 035 851 A1, in which numerous lubricant film pockets, which are formed by surface cavities, are imprinted into the ring surface of the thrust washer.

A thrust washer of a planetary gear train is known from DE 199 02 565 A1 which on both of its thrust surfaces has circumferential lubricating grooves which in the radial direction are connected to lubricant film pockets which are triangular in shape, the tips of which point radially outwards in each case and the bases of which lead into the circumferential grooves.

A thrust bearing for a turbocharger of a motor car is known from U.S. Pat. No. 4,639,148, which has a bearing washer which is arranged in a torque-proof manner in the turbocharger housing. The bearing washer has lubricant pockets arranged oppositely on both flat sides, wherein four of the lubricant pockets arranged opposite one another are connected to one another by two channels running axially through the washer. The lubricant pockets in each case have on their one lateral edge a transition area, so that a smooth transition from the lubricant pocket to the contact surface is provided. The axially running channels in each case end in the transition area of the lubricant pockets. The lubricant gets from a cavity arranged in the one bearing surface via channels running radially within the bearing washer into the axial connection channels and via these into the lubricant pockets. The cavity is arranged above the lubricant pockets, so that the lubricant reaches the lubricant pockets as a result of gravity.

Several embodiments for a front thrust washer of a universal joint, which has a plurality of lubricant pockets which are distributed or arranged in patterns on both flat sides of the front thrust washer, are known from DE 6810086 U. In one embodiment, the lubricant pockets are formed by radially running straight channels which extend radially from the central hole outwards and are arranged on only one flat contact side of the thrust washer, wherein axial channels respectively extend from one flat side to the base of the radially running grooves, so that fluid can get from one flat side of the front thrust washer to the other flat side into the lubricant pockets.

A rotary seal assembly, which has an annular part which has a plurality of pumping grooves on its flat sealing side, is known from US 2002/0014743 A1. The fluid gets from the flat side facing away from the sealing side via axially running feed channels into groove-shaped cavities of the sealing side, from which the pumping grooves extend curved radially outwards and radially inwards, wherein the axial depth of the pumping grooves decreases continuously starting from the groove-shaped cavity to the surface of the sealing side, so that a smooth transition to the sealing side of the annular part occurs. The pumping grooves are curved in such a way that the sealing fluid is conveyed from the groove-shaped cavities to the sealing face by the rotation of the annular part.

BRIEF SUMMARY OF EMBODIMENTS

The object of the present invention is to improve the previously described thrust washers with respect to their lubricating properties, in particular with respect to the supply of oil to both contact surfaces.

This object is achieved by a thrust washer having the features found in the accompanying claims.

The thrust washer according to the invention is advantageously characterised by the fact that two lubricant film pockets arranged on the opposite thrust surfaces are in each case connected to one another by at least one passage channel. Advantageously, the lubricant pockets are wider in the radial direction, so that they, on the one hand, provide enough room for an axial cross-hole to form the passage channel and, on the other hand, so that they can receive more lubricant in the radial direction with respect to the washer circumference.

It is not obligatory for all the lubricant pockets distributed around the circumference of the thrust washer to be connected by a passage channel to their corresponding lubricant pockets arranged in the opposite thrust surface. Thus, it is also possible that only every second, third or fourth lubricant pocket of a thrust surface is connected to its corresponding lubricant pocket by a passage channel.

The lubricant pockets are advantageously formed by cavities in the thrust surfaces, wherein they can be produced by imprinting, grinding or milling.

In order that a sufficient amount of lubricant can flow into the lubricant pockets, the lubricant pockets advantageously have radially inner lying feed channels which extend from the cylindrical inner surface of the thrust washer into the respective lubricant pocket and which likewise can be produced e.g. by imprinting, grinding or milling.

In addition, the lubricant pockets advantageously have a first area, into which the passage channels lead, so that a maximum exchange of lubricant between the two thrust surfaces can take place. The axial depth of the lubricant pocket can advantageously decrease with increasing radius, i.e. distance to the centre point of the thrust washer. The depth is measured from the distance from the thrust surface to the base of the lubricant pocket. However, the depth of the lubricant pocket can also be constant.

The sides of the lubricant pockets extending in the radial direction form edge areas which are smoothly rounded, i.e. the transition from the lubricant pocket to the thrust surface does not take place erratically but steadily here, whereby it is ensured that the lubricant film is not wiped off and hence the thrust surfaces are constantly wetted with a lubricant film from the lubricant pockets.

Advantageously, another area of the thrust surface is arranged between the wall radially outwardly delimiting a lubricant pocket and the radial face side of the thrust washer. The wall which radially outwardly delimits the lubricant pocket and is straight or adapted to the curve of the radial face side, in contrast to the radially running sides can be advantageously formed in such a way that lubricant cannot at least flow off radially outwardly over the entire length of the wall. Thus, this wall can be formed continuously sharp-edged, so that the lubricant film is wiped off. If, in particular for cooling purposes, the requirement is for lubricant to be able to flow off radially outwardly from at least one lubricant pocket, then an outlet channel can be provided in the thrust surface, which connects the lubricant pocket to the radial face side of the thrust washer. Of course, such outlet channels can be provided in the case of all, every second, third or fourth lubricant pocket.

The lubricant pockets are triangular in shape, wherein the one tip of the triangle is directed radially inwardly. The inlet channel advantageously runs through this tip and connects the central hole to the lubricant pocket. The radially outwardly running sides of the lubricant pockets, which advantageously form a rounded transition to the thrust surfaces, abut on the radially inner lying tip of the triangle.

The cylindrical inner wall formed by the central hole advantageously has a radial recess area in the area of at least one lubricant pocket for receiving lubricant. The inlet channels for the lubricant pockets advantageously respectively lead into the recess areas.

The previously described thrust washer according to the invention is advantageously characterised by the fact that a hydrodynamic lubrication is produced and no mixed friction occurs. Both thrust surfaces are wetted by the axial passage channels, as an oil circuit is established. The radial recesses for receiving lubricant, which can be arranged in the cylindrical inner wall of the thrust washer, and their connection to the lubricant pockets via the inlet channels ensure that lubricant is supplied to the thrust surfaces of the thrust washer on both sides.

The thrust washer can be advantageously manufactured from tempered steel, nitrocarburised steel or bronze. Of course, other materials are also possible.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1a shows a cross-sectional representation through the thrust washer according to FIG. 1;

FIG. 4 shows a cross-sectional representation of a part of a planetary gear train with the thrust washer according to the invention;

FIG. 4a shows a partial view of the planetary gear train according to FIG. 4.

DETAILED DESCRIPTION

Figure 1:
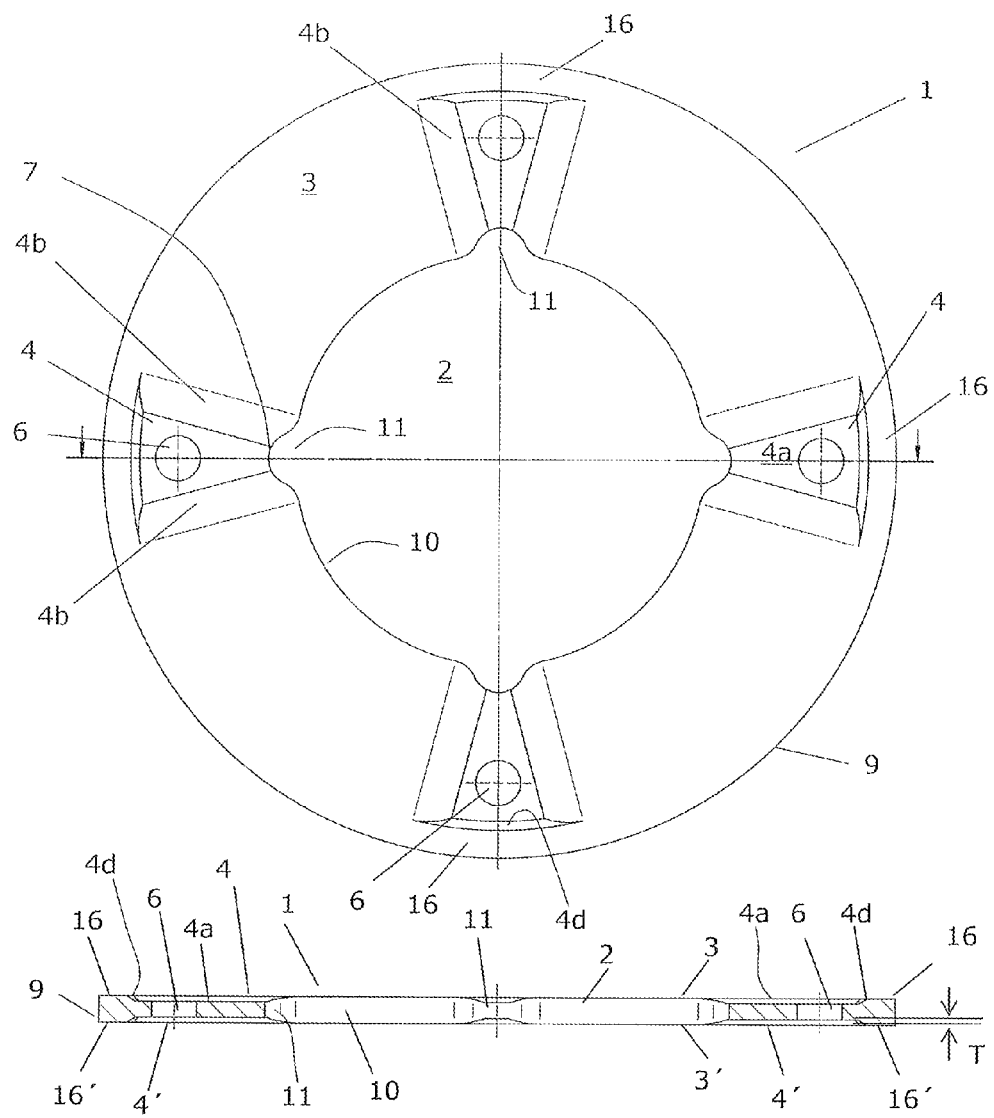
FIG. 1 shows a plan view of a first possible embodiment of the thrust washer according to the invention.
Figure 2:
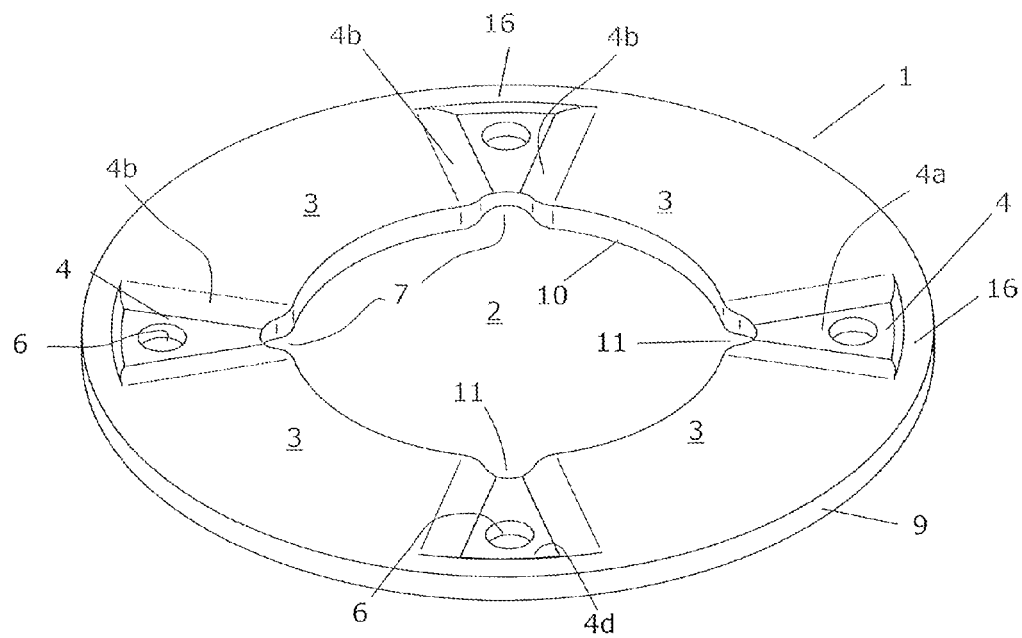
FIG. 2 shows a perspective view of the thrust washer according to FIG. 1.

FIG. 1 shows a plan view and FIG. 1a shows a cross-sectional representation of a first possible embodiment of a thrust washer according to the invention. The thrust washer 1 has a central hole 2 which is delimited by a cylindrical inner wall 10. The thrust washer has thrust surfaces 3, 3', 16, 16', against which needle bearings and planet gears butt with their face sides (see FIGS. 4 and 4a). In order that the needle bearings and planet gears do not rub on the thrust surfaces 3, 3', 16, 16' of the thrust washers 1, it must always be ensured that sufficient lubricant film wets the thrust surfaces 3, 3', 16, 16'. For this purpose, the thrust washer 1 has lubricant pockets 4, 4' which are connected to hollows or recesses 11 in the cylindrical inner wall 10 via feed channels 7 arranged radially internally in relation to the lubricant pockets 4, 4. Hence, the lubricant due to the centrifugal force gets from the hollows 11 into the lubricant pockets 4, 4' via the feed channels 7. The thrust washer 1 is constructed mirror-symmetrically, so that when it is fitted into e.g. a planetary gear train, as illustrated in partial views in FIGS. 4 and 4b, it cannot be fitted incorrectly.

The lubricant pockets 4, 4' are triangular in shape and formed by cavities in the thrust surfaces 3, 3'. The axial depth T of the lubricant pockets 4, 4' decreases from the feed channels 7 radially to the radial outer wall 4d. It is, however, also possible for the axial depth T to be equal over the radial extension. The radially outwardly running sides 4b form a continuous in particular round transition to the laterally abutting thrust surface 3, 3', so that an interruption in the lubricant film does not occur. The first area 4a of the lubricant pockets 4, 4' is arranged between the edge areas 4b. The axial passage channel 6, which connects together the first areas of the lubricant pockets 4, 4' corresponding with one another, leads into this first area 4a. The corresponding lubricant pockets 4, 4' are arranged oppositely and flush in relation to one another on both thrust surfaces 3, 3' of the thrust washer 1. The radially outer lying wall 4d is formed more steeply compared to the edge areas 4d and forms a sharp edge with the outer lying thrust surface areas 16, so that from the lubricant pockets 4, 4' little if any lubricant can flow off radially outwardly via the walls 4d.

Figure 3:
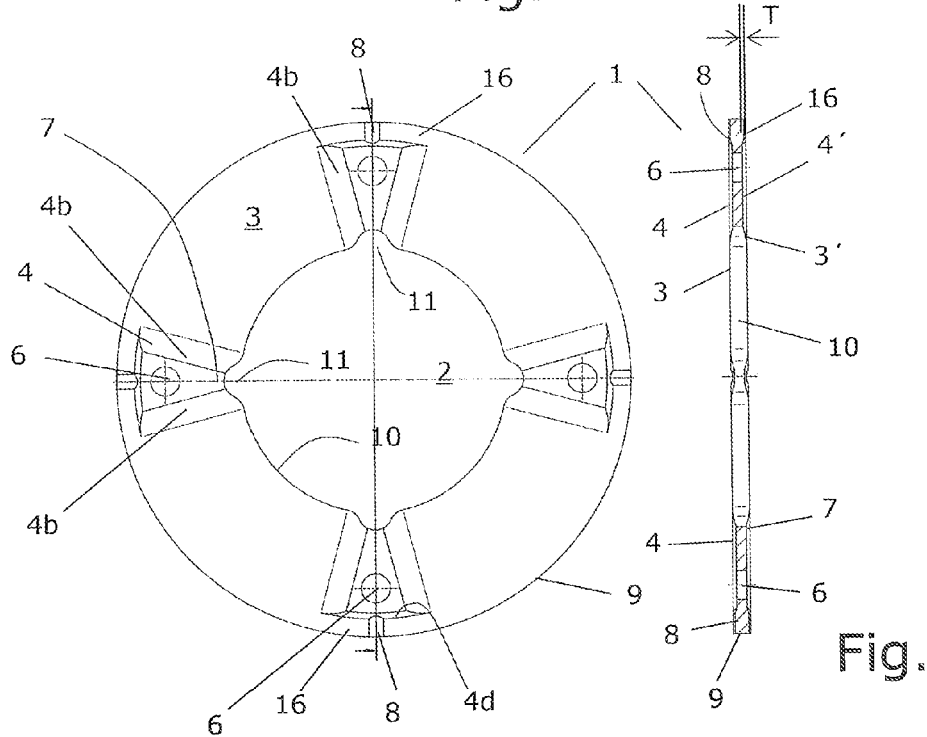
FIG. 3 shows a plan representation and a cross-sectional representation of a second possible embodiment of the thrust washer according to the invention.
Figure 3A:
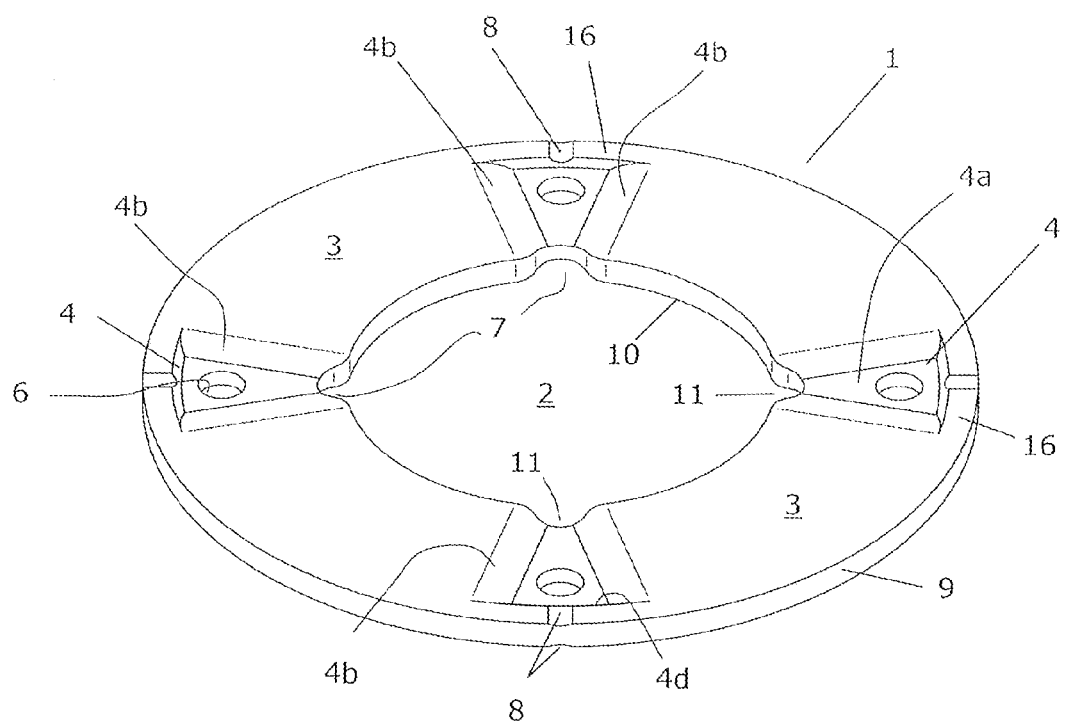
FIG. 3a shows a perspective view of the thrust washer according to FIG. 3.

If a radial outflow from the lubricant pockets 4, 4' outwards, in particular to cool the lubricant, is required then, as in the embodiment illustrated in FIGS. 3 and 3a, an outer lying radially running channel 8 can be provided, via which the lubricant can flow off from the lubricant pockets 4, 4' radially outwardly to the outer face side 9 of the thrust washer 1. Otherwise, the thrust washers 1 illustrated in FIGS. 1 to 3a are designed identically.

FIGS. 4 and 4a show a cross-sectional representation and an enlarged partial view of a planetary gear train with the thrust washer 1 according to the invention. The planetary gear train has a planet carrier 20, a planet bolt 21, a needle row 22 and planet gears 23. The thrust washer 1 is arranged on the planet bolt 21 between the face sides of the needle row 22 and a planet gear 23, on the one hand, and the planet carrier 20, on the other hand. Channels 24, 25, via which lubricant gets into the area of the needle row 22, are arranged in the planet bolt 21. From there, it gets into the radial hollows or recesses 11 of the cylindrical inner wall of the central hole 10 and hence into the feed channels 7 and the lubricant pockets 4, 4' arranged on both sides in the thrust surfaces 3, 3'. An exchange of lubricant between the opposing thrust surfaces 3, 3' takes place through the axial holes 6. The lubricant can further flow off radially outwardly via the radially outer lying run-off channels 8.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A thrust washer comprising:
    two flat thrust surfaces disposed on opposite sides of the thrust washer;
    a central hole for pushing onto a bolt or a shaft;
    lubricant pockets on both of the two flat thrust surfaces, wherein the lubricant pockets are formed by cavities in the thrust surfaces, wherein at least one of the lubricant pockets on one of the thrust surfaces is assigned a corresponding lubricant pocket on the opposite thrust surface, and wherein the at least one lubricant pocket is connected to the respective corresponding lubricant pocket corresponding to the at least one lubricant pocket by at least one channel that runs axially though the thrust washer,
    further wherein a respective one of the lubricant pockets has a first area which, at least on sides running radially outwards, has an edge area that forms a continuous transition from the first area to a thrust surface, and
    wherein at least one of the lubricant pockets is triangular in shape, wherein one tip of the triangle is directed radially inwards, toward the central hole, and wherein a respective lubricant pocket has at least one radially inner lying feed channel, wherein the feed channel runs through the radially inwardly directed tip and the axially running channel ends in the first area.

2. The thrust washer according to claim 1, wherein a side of a respective lubricant pocket opposite the tip is straight or is adapted to a curvature of a radial face side of the thrust washer.

3. The thrust washer according to claim 1, wherein a cylindrical inner wall formed by the central hole has a recess area disposed in an area of at least one of the lubricant pockets and configured for receiving lubricant.

4. The thrust washer according to claim 3, wherein the feed channel is connected to the recess area.

5. The thrust washer according to claim 1, wherein at least one of the lubricant pockets has at least one radially outer lying outlet channel formed by a cavity in one of the thrust surfaces, wherein the outlet channel extends to a radial face side of the thrust washer.

6. The thrust washer according to claim 1, further comprising at least one further lubricant pocket formed by a cavity in the thrust surfaces.

7. The thrust washer according to claim 6, wherein the at least one further lubricant pocket is formed by a cavity that is isolated from any other further lubricant pocket and from the lubricant pockets, wherein the cavity is circular, oval or rectangular in shape.

8. The thrust washer according to claim 1, wherein the channel running axially through the thrust washer is formed by a hole.

* * * * *